United States Patent [19]

Robinder et al.

[11] 4,456,853

[45] Jun. 26, 1984

[54] FEEDBACK CRT FOR USE IN A CLOSED-LOOP CORRECTION SYSTEM

[75] Inventors: Ronald C. Robinder, Beaverton; David J. Bates, West Linn; Dan F. Denham, Portland, all of Oreg.

[73] Assignee: Tektronix, Inc., Beaverton, Oreg.

[21] Appl. No.: 280,419

[22] Filed: Jul. 6, 1981

[51] Int. Cl.³ .................. H01J 29/51; H01J 29/54
[52] U.S. Cl. ..................... 313/421; 313/425; 313/427; 313/428; 315/368; 315/387
[58] Field of Search ............ 313/409, 412, 421, 425, 313/427, 428, 430; 315/13 C, 368, 387

[56] References Cited

U.S. PATENT DOCUMENTS

| | | | |
|---|---|---|---|
| 3,041,391 | 6/1962 | Chatten | 358/68 |
| 3,731,134 | 5/1973 | Iida . | |
| 4,099,092 | 7/1978 | Bristow | 315/10 |
| 4,203,051 | 5/1980 | Hallett et al. | 315/13 C |
| 4,203,054 | 5/1980 | Sowter | 315/368 |
| 4,335,380 | 6/1982 | Wright | 340/744 |

FOREIGN PATENT DOCUMENTS

| | | | |
|---|---|---|---|
| 53-36419 | 4/1978 | Japan | 313/412 |
| 54-23418 | 2/1979 | Japan | 315/368 |
| 822017 | 10/1959 | United Kingdom | 315/368 |
| 2052223 | 1/1981 | United Kingdom . | |

OTHER PUBLICATIONS

Axford, J., "Beam Position Feedback and Correlation in a Multibeam CRT", IBM Technical Disclosure Bulletin, vol. 24, No. 3, Aug. 1981, pp. 1516–1518.

*Primary Examiner*—Eugene R. LaRoche
*Assistant Examiner*—Vincent De Luca
*Attorney, Agent, or Firm*—Thomas J. Spence; John D. Winkelman

[57] ABSTRACT

A cathode-ray tube including feedback means capable of producing a feedback signal indicative of the position, in at least two dimensions, of a scanning electron beam. The feedback means comprises a plurality of feedback elements disposed at selected locations within the tube enclosure. With a shadow-mask type CRT, the elements are formed on the gun-side surface of the shadow mask itself. With other kinds of CRT's, the elements are formed either on an interior supporting member or on the interior surface of the display medium. In one embodiment, the elements are formed of a phosphorescent material. In other embodiments, the elements are formed of materials capable of producing, upon excitation by a scanning electron beam, signals of visual or electrical character. The signals thus produced may be employed in a closed-loop correction system to accomplish automatic convergence and/or geometric adjustment of a displayed image.

29 Claims, 12 Drawing Figures

FEEDBACK CRT FOR USE IN A CLOSED-LOOP CORRECTION SYSTEM

BACKGROUND OF THE INVENTION

The subject matter of the present invention pertains to means for controlling the deflection of an electron beam within a cathode-ray tube, and especially within such a tube employing multiple electron guns and a shadow mask.

The general construction of a conventional three-gun, shadow-mask type, cathode-ray tube and the manner in which it is operated to produce a raster-scan color image are well known to the art. Equally know to the art is that, absent dynamic correction, the image produced by such a tube will contain certain inherent distortions. Primary among these are pincushion distortion caused by the center of deflection of the three electron beams being located apart from the center of curvature of the tube's display screen (present in monochromatic as well as color CRT's), trapezoidal distortion caused by at least two of the electron guns being located off the longitudinal axis of the tube envelope, and misconvergence of the beams at the tube's shadow-mask caused by the guns being displaced from one another laterally. With a delta-gun configuration, all three guns are spaced about the longitudinal axis of the gun assembly; with an in-line configuration, one gun is located on axis and the other two are spaced at either side.

The usual method of correcting geometric distortion is to impress certain analog correction factors onto the deflection signals used to deflect the beam or beams back and forth across the display screen to produce the image raster. Misconvergence is usually corrected by a similar impression of different analog correction factors onto the magnetic fields used to converge the three beams at center screen. Of the two distortions, the most difficult to correct accurately and uniformly, and one which requires periodic adjustment, is that of misconvergence.

Basic schemes for accomplishing dynamic beam convergence include the production of individual vertical and horizontal signals for each of the beams within the tube. Approximating somewhat the form of slightly skewed parabolas, the correction signals provide zero correction at center screen and increasing correction as the beams are deflected away from center. Such a basic approach is usually adequate for a home television environment where viewers are not overly critical and viewing distances are on the order of 6 to 10 ft. In the field of information display, however, where viewers are more critical and viewing distances much shorter, and more importantly, where resolution requirements are much more strict, the amount of misconvergence left uncorrected by such a basic approach is unacceptable.

An improvement over the basic scheme described above is exemplified by the 4027 color graphics terminal produced by Tektronix, Inc., the assignee of the present invention, wherein the display screen is divided into several sub-areas and different correction signals, independently adjustable, are generated for each such division. Such an approach permits a more accurate convergence of the three beams over the entire area of the screen. In the 4027, the display screen is divided into nine sub-areas and the beams may be converged in each such area by the adjustment of three potentiometers, one for each beam. Although providing increased correction, such a scheme still requires the somewhat time-consuming adjustment of 27 different potentiometers, three for each of the nine sub-areas. Other known schemes divide the display screen into an even greater number of sub-areas (the Tektronix 690 color monitor, for example, uses thirteen) and require the attendant adjustment of an even greater number of potentiometers. A common disadvantage of such schemes is the requirement for a human operator to assume full control of the display system for the time necessary to perform the several adjustments at each individual sub-area.

More recent developments include digital convergence schemes wherein correction information may be entered digitally, via a keyboard or other similar means, for conversion into analog signals producing the desired amount of beam adjustment. Examples of such schemes includes those disclosed by Hallett et al. U.S. Pat. No. 4,203,051 and its companion Sowter U.S. Pat. No. 4,203,054, both of which are assigned to IBM, and the SRL Model 382 color display developed by Systems Research Laboratories, Inc., of Dayton, Ohio. The IBM scheme is also described in an article by J. S. Beeteson et al. "Digital System for Convergence of Three-Beam High-Resolution Color Data Displays" appearing at page 598 of the September 1980 issue of IBM J. Res. Develop., Vol. 24, No. 5. A description of the SRL convergence scheme may be found in a paper entitled "A 25-In. Precision Color Display for Simulator Visual Systems" by R. E. Holmes and J. A. Mays of Systems Research Laboratories. A common characteristic of both the IBM and SRL systems is the use of a keyboard permitting operator entry of digital information representing the degree of movement necessary for each of the three beams to accomplish their convergence or other geometric adjustment. The IBM system permits the beams to be individually adjusted at 13 different points over the display area, while the SRL system permits adjustment at 256 different points.

A semi-automatic scheme for performing deflection adjustments only is disclosed in Bristow U.S. Pat. No. 4,099,092. In that scheme, a photodiode array or solid-state imaging camera positioned in front of a CRT display, and a digital computer, are employed to generate correction factors for later application, via a programmable read-only memory, to the conventional deflection waveforms.

A common disadvantage of all known prior art schemes is that a human operator is still required to assume full control of the system during the time necessary to perform the convergence or geometric correction operation.

SUMMARY OF THE INVENTION

The present invention is directed to a unique cathode-ray tube (CRT) capable of providing information indicative of the horizontal and vertical position of a scanning electron beam. Operation of the tube in a closed-loop correction system permits the automatic control of both convergence and geometry in a displayed image.

The tube of the present invention comprises generally an otherwise conventional CRT including a display screen of phosphorescent material, one or more electron guns for permitting an electron beam to be produced and directed toward the display screen, and feedback means interposed between the electron guns and the display screen for producing, upon bombardment by an electron beam, an indication representative of the precise location of the electron beam in the requisite two dimensions. One embodiment of the tube comprises an otherwise conventional shadow-mask type color cathode-ray tube having a plurality of feedback elements spaced over one surface of its shadow mask, together with means permitting certain signals produced by the elements to be detected. The elements are configured and arrayed spatially so as to produce, upon being scanned by a passing electron beam, a signal or signals containing the desired precise positional information.

Other embodiments of the tube of the present invention include a monochromatic cathode-ray tube having a plurality of smaller feedback elements spaced over or about the interior surface of its display screen.

Those persons familiar with the art will recognize a slight similarity between the tube of the present invention and such diverse devices as monoscopes, flying spot scanners, and beam-index tubes. A monoscope comprises a substantially conventional CRT having a target that is separated into a plurality of character-defining regions of a particular secondary-emitting material. Interrogating a selected region with a scanning raster produces an indication defining a selected character. A flying spot scanner is somewhat similar in that it includes a phosphorescent screen overlaid with an opaque material that is pierced by character-defining apertures. When a selected aperture is interrogated with a similar scanning raster, an indication is produced that also defines a selected character. Beam-index color tubes, of course, are well known to the art. Their primary feature is a multi-banded display screen that is overlaid on one side by an interstitial array of index bands. As will be more apparent later, any similarity between these devices and the tube of the present invention is of first impression only.

The primary function of the tube of the present invention is to facilitate the automatic performance of both convergence adjustment and geometric alignment with a cathode-ray tube display system. (As used in this specification, the term "geometric alignment" includes those beam adjustments necessary to affect the size, position, linearity, orthogonality, and the like, of a displayed image, as well as those adjustments necessary to correct such image disorders as pincushion distortion and trapezoidal distortion.) Although associated more frequently with shadow-mask type color CRT's, convergence (or controlled misconvergence) is an important consideration in the operation of any CRT, monochromatic or color, having multiple electron guns and a common, shared deflection system.

A closed-loop correction system suitable for use with the tube of the present invention is disclosed in copending U.S. application Ser. No. 280,420 filed concurrently herewith by Ronald C. Robinder and Dan F. Denham and assigned to Tektronix, Inc., the assignee of the present invention. For completeness of disclosure, the Robinder and Denham application is incorporated herein by this reference.

Although the feedback elements within the tube may assume a number of different configurations, a particularly useful configuration, especially for use with a shadow-mask type CRT comprises two disjointed legs of a right triangle, one vertical and one inclined, spaced at preselected locations over the surface of the shadow mask opposite the three electron guns. In one embodiment, the elements are formed of a rapid-decay phosphorescent material and the means for detecting the feedback signal includes one or more photo-multiplier tubes or semiconductor photo-detectors optimized to respond to the particular illumination spectrum illumination produced by the phosphor upon excitation by a passing electron beam. In another embodiment, the element is formed of a material capable of emitting secondary electrons upon similar excitation and the detector means includes one or more collectors of secondary electrons. In still another embodiment, the elements are formed as apertures in a conductive coating insulated from the mask surface, and the detector means comprises means for detecting currents induced into the conductive coating and/or the shadow mask itself by the passing beam. As the elements are all formed on the rear surface of the tube's shadow mask, they do not affect the integrity of the displayed image.

A feedback element configuration particularly useful with a monochromatic-type CRT is a small dot or point that may be interrogated via a series of raster line scans. The elements are spaced at preselected locations over the interior aluminized surface of the CRT display screen. If the elements are made sufficiently small, they may be placed within the viewing area without affecting significantly the integrity of any displayed image. If not, they may be spaced outside the viewing area. In either case, the elements may be formed of a rapid-decay phosphorescent material such as that suitable for use with the aforementioned shadow-mask embodiment, or any of the other schemes mentioned herein.

Irrespective of the composition of the feedback elements, the signals produced by their scanning excitation contain certain timing relationships representing the precise position of each electron beam within the tube relative to other beams, if any, and to the physical location of the individual elements. These timing relationships may be discerned and further processed by a microprocessor or other suitable processing entity to determine the correction factors necessary to perform the desired geometry and convergence adjustments. As determined, the correction factors may be applied to the convergence and deflection circuits by known means, analog or digital, including those disclosed in the IBM, SRL, and Bristow references cited earlier.

The primary advantage of the tube of the present invention is that it permits the human operator to be eliminated totally from the convergence adjustment and geometric correction processes. It also permits those processes to be performed with sufficient speed and efficiency as to appear uninterruptive of the normal operation of the surrounding display system.

It is, therefore, a principal objective of the present invention to provide an improved cathode-ray tube including feedback means permitting the precise location of a scanning electron beam.

It is an additional principal objective of the present invention to provide an improved cathode-ray tube including feedback means capable of producing, upon excitation by a passing electron beam, a feedback signal indicative of the position of such beam in two dimensions.

It is a further principal objective of the present invention to provide an improved shadow-mask type color cathode-ray tube including feedback means capable of producing such a feedback signal.

It is a still further principal objective of the present invention to provide an improved shadow mask for use in a color cathode-ray tube, such shadow mask including means for producing an indication representative of the position of an electron beam within such tube.

The foregoing objectives, features, and advantages of the present invention will be more readily understood upon consideration of the following detailed description of the invention taken in conjunction with the accompanying drawings.

DETAILED DESCRIPTION OF THE PREFERRED EMBODIMENT

In the discussion that follows, a basic understanding of cathode-ray tube (CRT) type display devices, and especially those employing shadow-mask type color cathode-ray tubes, is assumed.

As is known to the art, the three electron beams of a conventional shadow-mask type cathode-ray tube must converge at the shadow mask apertures in order to produce an image of acceptable color fidelity. With a delta-gun arrangement, such convergence is usually achieved by the modulation of certain electromagnetic fields through which the beams are constrained to pass on their way to the mask apertures. With an in-line gun arrangement, the process is somewhat different, but the basic concept still applies. For convenience, the initial part of this disclosure assumes a delta-gun type cathode-ray tube. Such assumption is not meant to be limiting in any way. Moreover, the scope of the present invention is not limited to shadow-mask type color CRT's; as indicated below, many of the principles to be discussed apply as well to single- or multi-beam monochromatic tubes.

Figure 1:
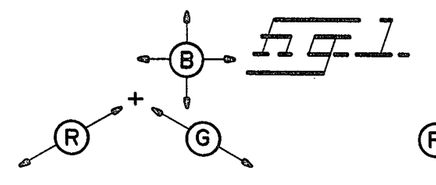
FIG. 1 is a symbolic representation of the beam adjustments available in a conventional delta-gun, shadow-mask type cathode-ray tube.
Figure 2:
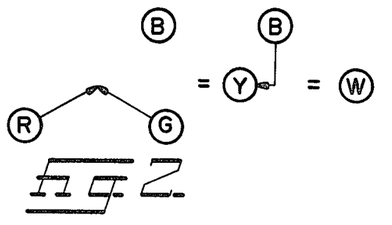
FIG. 2 is a symbolic representation of the procedure usually followed to converge the beams of FIG. 1.

In FIG. 1, there is indicated the four degrees of beam adjustment usually available, and necessary, to converge a delta-gun cathode-ray tube. Each beam position, as seen from the operator's side of the cathode-ray tube display screen, is represented in FIG. 1 by a circle enclosing the letter R, G, or B to indicate the particular color, red, green, or blue, respectively, produced by the beam. The arrows indicate the available adjustment directions. As is the convention, the red and green beams may be moved in one diagonal dimension each toward or away from a common convergence point, represented in FIG. 1 by a small cross, while the blue beam may be moved both horizontally and vertically. In practice, as suggested in FIG. 2, the red and green beams are converged first to form a yellow indication, and the blue beam is then moved into spatial coincidence to form the white indication of complete convergence. The symbol actually displayed on the cathode-ray tube screen to facilitate the convergence process is a matter of choice.

Figures 3, 4:
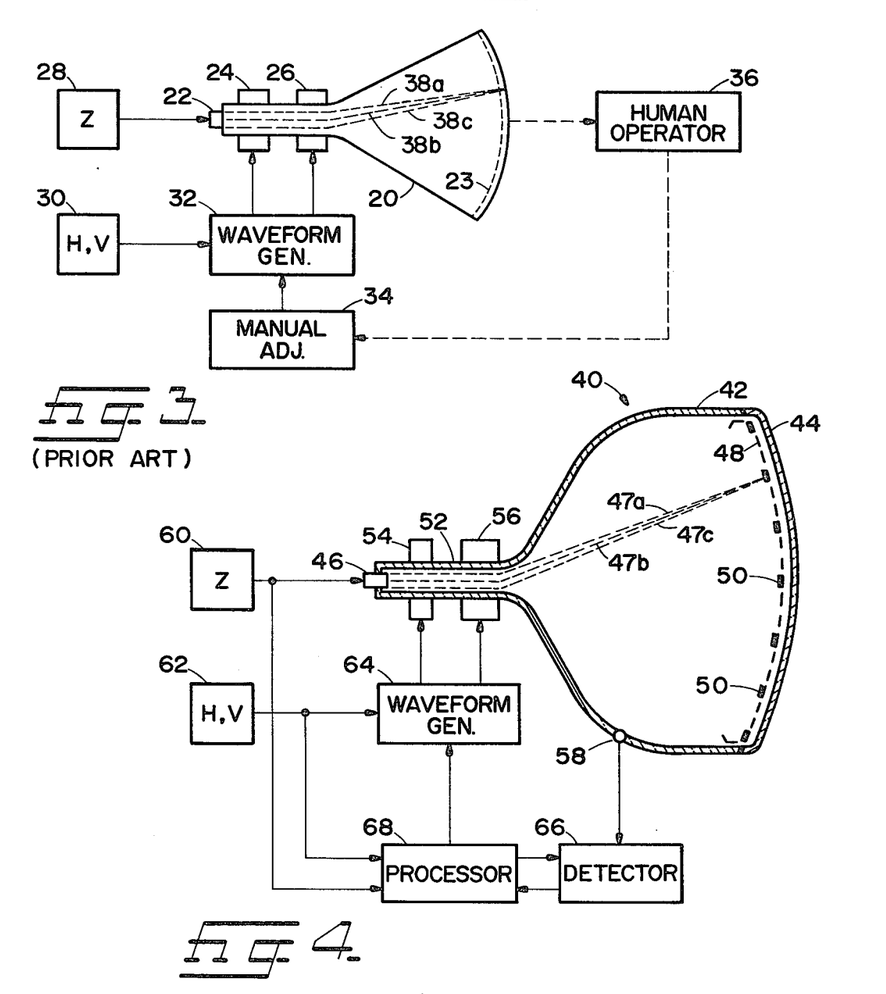
FIG. 3 is a block-diagram representation of a prior art correction system.
FIG. 4 is a block-diagram representation of the cathode-ray tube of the present invention and a closed-loop correction system employing same.

A basic prior art system for performing the convergence process is shown schematically in FIG. 3 as including a cathode-ray tube 20 with its three-element gun assembly 22 and shadow mask 23, a convergence assembly 24, a deflection yoke (or plates) 26, a source 28 of Z-axis or image signals, a source 30 of horizontal and vertical synchronization signals, a waveform generator 32 for producing the gross convergence and deflection waveforms, and some means 34 for permitting a human operator 36 to select manually certain correction factors for application to the gross waveforms of the generator 32. Examples of such a prior art system include the Tektronix 4027 color graphics terminal and the IBM and SRL systems cited in an earlier part of this specification. In the Tektronix 4027, the waveform generator 32 and the manual adjustment means 34 are analog; in the SRL system, the waveform generator is analog and the adjustment means is digital; and in the IBM system, both functions are digital. A common feature of each system is the requirement for the human operator 36 and complete dedication of the system during the time necessary to perform the correction operation. As suggested earlier, the primary function of the prior-art system is to permit the operator 36 to manually adjust certain correction waveforms in a manner causing the three electron beams 38a,b,c, first, to converge at the shadow mask 23, and second, to define a geometrically acceptable image. In a fourth system, that of Bristow also cited earlier, the human operator 36 is augmented by an external sensing device and the correction waveforms are generated automatically; however, the requirement for the operator's presence and the dedicated system still remain.

Referring now to FIG. 4, there is shown in similar schematic form a first embodiment of the cathode-ray tube of the present invention and an exemplary closed-loop correction system for using same. As disclosed in the figure, the cathode-ray tube 40 includes an envelope 42 having a phosphor-coated display screen 44 at one end and a three-element gun assembly 46 at the other. Disposed adjacent the display screen 44 is a perforated metal shadow mask 48, over the gun-side surface of which are spaced a plurality of feedback elements 50 described in more detail below. With the exception of the feedback elements 50, the tube 40 defines a conventional shadow-mask type color cathode-ray tube.

The exemplary system for using the tube 40 includes, besides the tube itself, a convergence magnet assembly 54 and deflection yoke (or plates) 56 mounted around (or within) the neck portion 52 of the tube envelope 42, a source 60 of Z-axis signals, a source 62 of horizontal and vertical deflection signals, and a waveform generator 64. Also included are a detector circuit 66 for detecting, via a suitable interface 58, certain feedback signals present during operation of the tube and for producing in response thereto second signals indicative of the position of each beam 47a,b,c within the tube; and a processor 68 responsive to such second signals for producing certain correction factors for application, as before, to the gross convergence and deflection waveforms of the generator 64.

During operation, as discussed more fully below, positional information obtained by scanning the feedback elements 50 with an electron beam 47 is employed by the processor 66 to produce correction signals for application to the convergence and deflection waveforms produced by the generator 64 so as to effect both convergence and geometry corrections. A more comprehensive disclosure of the system of FIG. 4 may be found in the concurrently-filed Robinder and Denham application cited in an earlier part of this specification.

The feedback elements 50 may be realized in several forms. One such form is a rapid-decay phosphorescent material, for example P47 phosphor, deposited at selected locations over the gun-side surface of the shadow mask 48. Other forms are suggested below. With elements 50 of a phosphorescent material, the appropriate interface 58 is a photomultiplier tube positioned external to the tube 40 and adjacent a transparent viewing port formed in the tube's envelope 42. The use of a small circle in FIG. 4 to depict the interface 58 is symbolic only and is not meant to specify a particular mechanical, optical, or electrical connection. As disclosed below, the interface 58 may assume other forms as well.

The elements 50 may be of any size and configuration capable of providing both horizontal and vertical position information regarding a passing electron beam. An assortment of feedback element configurations that have been investigated thus far include those shown in FIG. 5. Each element in the figure is depicted as it would be seen, if possible, from the observer's side of the cathode-ray tube display screen. As arrayed across the surface of the shadow mask 48, the elements would be reversed from left to right. Those element configurations including both vertical and inclined members or boundaries have been found to provide the most reliable and least ambiguous feedback signals. Other element configurations capable of providing the required horizontal and vertical position information may be employed without departing from the invention as disclosed. Note particularly, however, that a feedback element comprising a single band extending completely across the shadow mask or display screen, in the manner of a beam-index tube, would not be suitable as such an element would be capable of providing beam-locating information in one dimension only.

Figure 6:
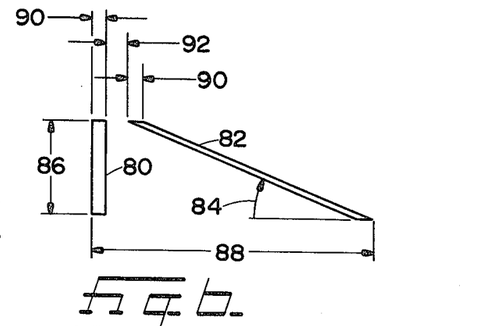
FIG. 6 is an enlarged representation of a particularly useful feedback element configuration.

An example of a feedback element configuration that has been found to be particularly advantageous is shown in FIG. 6 and forms the basis of the following discussion. As seen in the figure, the element comprises two disjointed legs 80, 82 of a right triangle, the first or leading leg 80 being oriented vertically and the second or trailing leg 82 being inclined at an angle 84 of 30° from the horizontal (60° with respect to leg 80). The terms "leading" and "trailing" are defined with respect to the direction of beam travel which, in the figure, is assumed to be from left to right. (Recall that the element is shown in FIG. 6 as it would appear, if observable, from the operator's side of the display screen. From the gun side of the shadow mask, the element would appear reversed and the beam movement would be from right to left.) The terms "horizontal" and "vertical" have their usual meanings with respect to electron beam deflection within a cathode-ray type display tube.

Typical dimensions for the element of FIG. 6 are a height 86 of about 0.3" to about 1", an overall length 88 of about 0.6" to about 1.75", a leg width 90 in the horizontal direction of about 0.01" to 0.1", and a leg separation 92 substantially equal to the horizontal leg width. Other dimensions may also be suitable depending on the other characteristics of the system, the important criteria being that the element be predictably locatable by a scanning electron beam and that the signals produced by such scanning be both recognizable and distinct. Moreover, the height 86 should be sufficient to permit scanning beams to be adjusted vertically the distances required to obtain their convergence without leaving the leg 80, and the leg separation 92 should be such as to ensure that two distinct signals will be produced no matter where in the vertical plane the element is scanned. The constant or equal horizontal width 90 of the two legs 80, 82 is chosen so that the two signals will be of similar amplitude and duration. The suggested angle 84 of 30° is chosen to align the leg 82 with the perforations of the shadow mask 48. This latter characteristic is not critical, however, as the relationships between the perforation diameters, the beam diameters, and the overall size of the element tend to minimize any nonuniformities caused by misalignment of the element components with the aperture array. The same element configuration may also be used with a shadow-mask tube of the in-line gun type and with monochromatic tubes.

Figure 7:
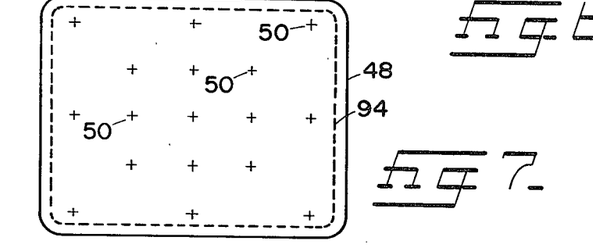
FIG. 7 is a representation of the shadow mask of the cathode-ray tube of the present invention showing suggested array of feedback elements.

In FIG. 7, there is shown the gun-side surface of the shadow mask 48. As indicated therein, and the sectional side view of FIG. 4, the feedback elements 50 (depicted as small crosses in FIG. 7) are disposed over the shadow mask surface in a manner forming a regular spaced array of such elements. Depending on the choice of the designer, the elements may be located wholly within a predefined quality area, indicated by the dashed rectangle 94, or partially without. As each element defines the center of a sub-area of display space over which the three beams of the cathode-ray tube may be accurately converged and aligned, the number and location of elements used is largely a matter of correction resolution. The pattern shown in FIG. 7 permits convergence and geometry correction to be accomplished at 17 different locations; center, top and bottom, left and right, the four corners, and at similar points therebetween. For systems employing totally digital convergence, larger arrays (i.e., 30 to 256 members) of equally spaced, but proportionately smaller, elements are more desirable. As discussed more fully below, each feedback element 50 may be interrogated individually by a scanning electron beam and the convergence and correction operations may be performed on a point-by-point basis or over the whole display area at one time.

Figure 8:
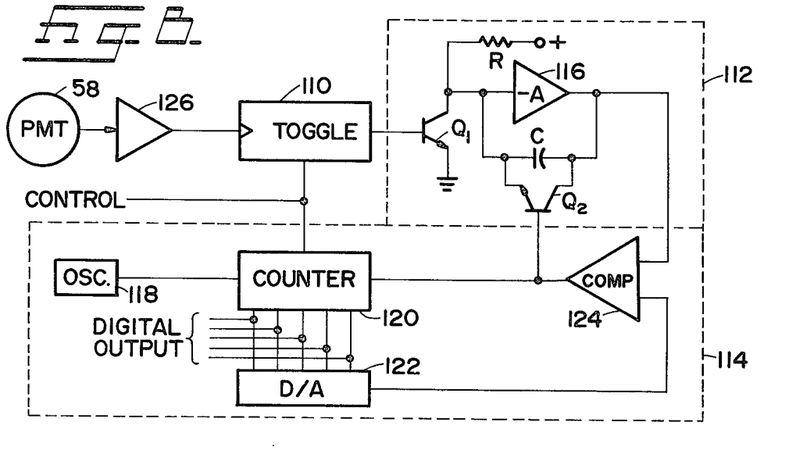
FIG. 8 is a simplified schematic representation of a position detector circuit forming a part of the system of FIG. 4.

An exemplary position detector circuit for use with the tube and system of FIG. 4 is disclosed in FIG. 8. For purposes of illustration, the feedback elements 50 are assumed to be formed of a phosphorescent material as suggested earlier, and the interface 58 is therefore depicted symbolically as a photo-multiplier tube. As disclosed, the circuit of FIG. 8 includes a toggle-type flip-flop 110 for switching between alternate output states in response to a predetermined series of switched input signals, a ramp generator 112 for converting one output state of the toggle 110 into an analog magnitude, and an analog-to-digital converter 114 for producing a digital representation of the analog magnitude. The ramp generator 112 includes an amplifier 116 and two transistor switches Q1 and Q2 for controlling the charge developed across a capacitor C. The converter 114 includes a digital oscillator 118 and counter 120 for developing a digital count, and a digital-to-analog converter 122 and comparator 124 for stopping the counter 120 and resetting the ramp generator 112 when the count in the counter is equivalent to the charge across the capacitor. Also included in the circuit of FIG. 8 are an amplifier 126 for controlling the amplitude of the photo-multiplier signal. The function of the circuit is to provide digital timing signals representative of the horizontal and vertical position of a given raster line segment, or scan line, relative to a selected feedback element. (The use in this specification of the term "raster line segment" is not meant to limit the disclosed invention to a raster-scan environment. As will be appreciated by those persons skilled in the art, the invention is equally applicable and useful in a directed-beam (e.g., caligraphic) environment.

Figure 9:
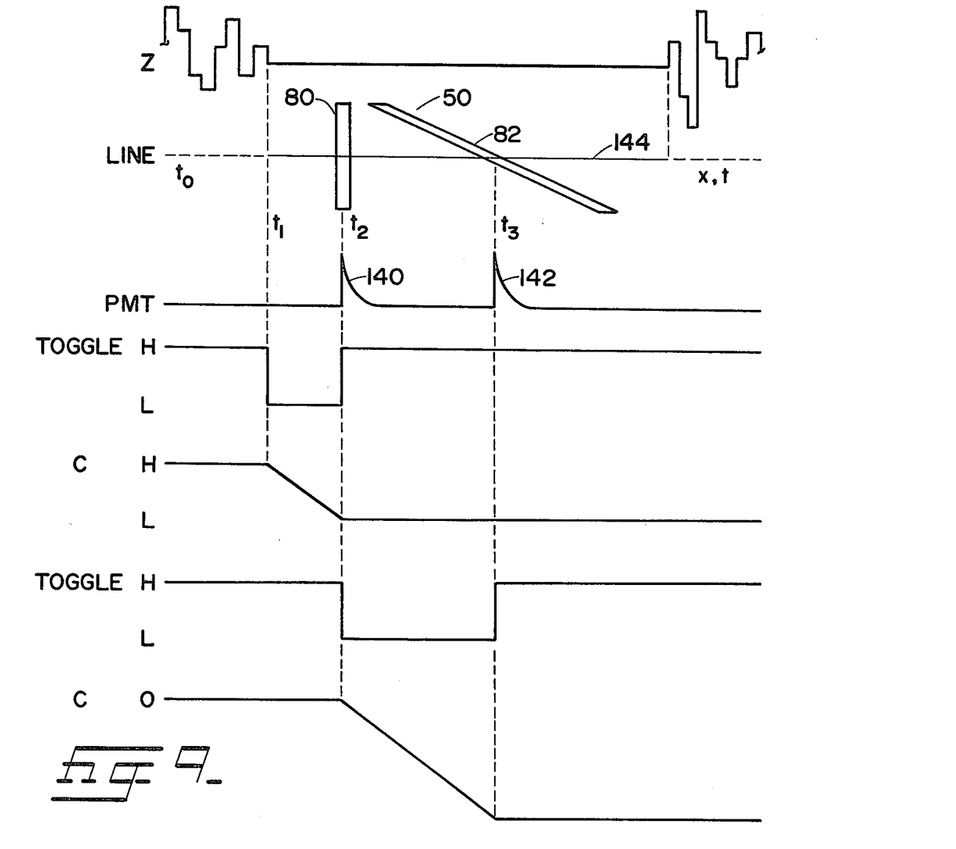
FIG. 9 is a timing chart showing certain signals produced within the circuit of FIG. 8 during its operation.

Operation of the circuit of FIG. 8 is best understood with reference to the signal chart of FIG. 9. To determine the position of a given raster line, for example a red line passing through the center of the display area, with respect to a selected feedback element, for example an element located at the left center edge of the display area, it is necessary only to produce a scan line of sufficient length and spatial displacement to traverse both legs of the selected element. The first traversal produces signals representative of the line's horizontal position, and the second produces signals representative of its vertical position. By repeating the procedure for each of the three color components of the same scan line, the adjustments necessary to produce their convergence or other spatial relationship can be readily determined. By knowing the physical location of the feedback element relative to the display area, the adjustments necessary to accomplish geometric corrections can also be readily determined.

In FIG. 9 there are shown the Z-axis (Z) and feedback (PMT) signals received by the circuit of FIG. 8, and the toggle states (TOGGLE) and capacitor charge (C) produced in response thereto. Note that there are two sets of TOGGLE and C signals, one for a first traversal of the feedback element and one for a second. Also shown in the chart of FIG. 9 is the scan line (LINE) produced by the Z-axis signal. Superimposed over the scan line signal is a feedback element of FIG. 6 to indicate symbolically the position of the generated line segment, or scan line, relative to the two legs 80, 82 of the element. The horizontal ordinate of the LINE curve is therefore measured in both time and distance.

At a time $t_0$ before the chosen scan line is generated, suitable control signals are issued by the processor 68 to set the toggle 110 to its high state, and set the counter 120 to a preselected initial value, e.g. zero. Under these conditions, the input to the amplifier 116 is grounded and the capacitor C is discharged. Horizontal deflection is then initiated and the three beams within the cathode-ray tube begin their movement from left to right across the display area. At a predetermined time $t_1$ before reaching the selected feedback element 50, the Z-axis signal to one of the electron beams, for example red, is maintained at a constant amplitude so as to produce a trace of uniform intensity. Concurrently, the Z-axis signals applied to the green and blue electron guns are set to zero. A suitable control signal is also issued by the processor 68 to set the toggle 110 to its low state as indicated by the upper TOGGLE curve. With the toggle 110 in its low state, transistor Q1 is biased nonconductive, and the capacitor C begins to charge. This is indicated by the upper C curve of FIG. 9. At time $t_2$, the red beam encounters the leading leg 80 of the element 50, causing the material of the element to phosphoresce and produce a first feedback indication. This latter indication is detected by the photo-multiplier tube 100 to produce the first PMT pulse 140. Receipt of the PMT pulse 140 causes the toggle 110 to switch back to its high state, and thereby restore the ground connection to the input of the amplifier 116 and terminate the charging cycle of the capacitor C. A suitable control signal is then issued to prevent the toggle from reacting to the next PMT pulse 142 discussed more fully below. At this point, the charge on the capacitor C is an analog representation of both the horizontal distance and the elapsed time between the start of the constant intensity line segment 144 and its encounter, or intersection, with the leading leg 80 of the element 50.

Note that the portion of the Z-axis signal defining the scan line 144 need be at an amplitude just sufficient to produce a usable feedback signal. Such amplitude may be less than that necessary to produce a trace visible to the system operator.

Before the next operation of the circuit of FIG. 8, a suitable control signal is be issued to cause the counter 120 to begin counting. When the digital count thus produced, converted to an analog signal by the converter 122, reaches a value equivalent to the magnitude of the charge developed within the capacitor C, the comparator 124 issues a signal stopping the count and discharging the capacitor. When so stopped, the count in the counter 120 is a digital representation of the horizontal distance and time mentioned above. This digital representation locates the scan line 144 with respect to the vertical plane represented by the leading leg 80 of the element 50.

To locate the scan line 144 relative to a horizontal reference, the circuit of FIG. 8 is reinitialized and the horizontal scanning operation repeated. This time, at time $t_1$, when the constant intensity scan line 144 begins, no signal is issued to the toggle 110 and the toggle remains in its high state as indicated by the lower TOGGLE curve of FIG. 9. Now, at time $t_2$ when the scanning beam encounters the leading leg 80 of the element 50, the resultant PMT pulse 140 causes the toggle 110 to switch to its low state and start anew the charging of the capacitor C. This is indicated by the lower C curve of FIG. 9. At time $t_3$, when the beam encounters the trailing leg 82 of the element 50, the resultant second PMT pulse 142 causes the toggle 110 to return to its high state and terminate the charging operation. The digital signal produced in the counter 120 by the renewed operation of the converter 114 is now a representation of the horizontal distance and time elapsed between the points of intersection of the scan line 144 and the two element legs 80 and 82. Because of the inclined nature of the trailing leg 82, the signal is also a representation of the vertical position of the line segment 144 relative to the element 50. If the precise physical location of the element 50 is known, this vertical information may be used to accomplish geometric correction, such as, for example, by causing the scan line 144 to move in a direction causing the difference between the detected elapsed time and the elapsed time representing the known physical location of the element 50 to be reduced below a predetermined limit. It is not necessary, however, that the physical location of the element be known in order to achieve convergence.

Practice in a non-interlaced, raster-scan environment has shown that the position detector circuit of FIG. 8 and the processor 68 can be made sufficiently fast to permit the information gained during a first horizontal scan of a selected feedback element 50 to be digitized and stored before the next succeeding scan of the same element. Thus, it is possible to obtain horizontal and vertical positional information for a given scan line in less than the time required to produce two successive raster lines. After the red beam information has been obtained and stored for a given line segment and feedback element, the process is repeated to obtain the corresponding information for the green and blue beams. As the horizontal position information is the same for both scans of a particular color, it matters not which of the two operations described above is performed first. It is only necessary that the line segment employed to obtain the vertical information be the same for each of the three colors.

Analysis of the information thus obtained is fairly straight-forward and is disclosed in detail in the aforementioned application of Robinder and Denham. The particular process or algorithm employed to calculate the correction factors to be applied to the convergence waveforms is somewhat of a design choice and well within the skill of the experienced designer. The choices include a purely iterative solution wherein the beams are repeatedly moved in unit steps until convergence is obtained, a purely mathematical solution wherein the required correction is calculated and the beams are moved in one step, and a hybrid or intermediate solution wherein the beams are moved iteratively, but in steps related to the degree of their misconvergence. For practical purposes, convergence is obtained when the differences between the respective elapsed times have been reduced below a predetermined design limit. The solution most suitable for a particular system will depend upon such factors as the amount of time available to perform the necessary calculations and the speed and sophistication of the calculating entity.

The correction process described in the cited application may be performed automatically according to a predefined schedule or on operator command. When performed automatically, the line segments 144 would appear so quickly and infrequently as to be practically unnoticable by the system operator. Assuming a 60 Hz image raster, each line segment tests for less than 1/60 second and, after initial warm up, correction intervals are measured in hours. Even so, there are applications, such as display photography, where any interruption is intolerable and manual disable or initiation of the correction process may be desirable. The circuitry necessary to effect such manual control is well within the skill of the art.

In the preceding discussion, the feedback elements 50 have been assumed to comprise a fast-decay phosphor material applied to the gun-side surface of the shadow mask 48. Suitable phosphor materials include those known in the industry as P46 and P47. P46 phosphoresces in the yellow range and P47 phosphoresces in the ultraviolet range. Both phosphors demonstrate a fairly fast decay and are therefore capable of providing a clear indication of beam passage. Selection of the phosphor and the interface 58 should be made together as the interface, for example the photo-multiplier tube suggested earlier, must be matched to the wavelength of the phosphor radiation. With a photo-multiplier tube or other optical-type sensor, of course, a transparent window or viewing port will need to be provided in the side wall of the cathode-ray tube envelope. Special care may also have to be taken to prevent the illumination received by the sensor from being contaminated by light other than that produced by a passing electron beam. Such considerations are well within the skill of the art and especially within the skill of those persons familiar with the somewhat related field of beam-index tube technology.

The feedback elements 50 may also be formed of a material capable of emitting secondary electrons upon bombardment by a passing electron beam. In this case, the interface 58 would comprise a suitable collector or plurality of collectors of secondary electrons positioned inside the tube enclosure and accessible from the outside via a suitable conductor. A known emitter of secondary electrons is magnesium oxide (MgO). The configuration and placement of secondary collectors is well known to the art and well within the skill of those persons familiar with the design and manufacture of, for example, monoscope-type character generator tubes.

The size and placement of the feedback elements 50 over the surface of the shadow mask 48, while subject to certain restrictions, are almost a matter of design choice. As mentioned earlier, the primary consideration is that the signals produced by scanning the elements be clear and distinct. Thus, the elements must be large enough to produce a usable signal over a limited range of beam adjustment, yet small enough to permit adequate separation. If the elements are located too close to one another, more intelligence is required in the processor 68 to distinguish between signals produced by the various components of a single element and those that might be produced by one component of a first element and another component of a next adjacent element. The latter set of signals might occur if the beams where grossly misaligned at the start of a convergence or other correction process. As the amount of beam adjustment usually necessary to obtain convergence is on the order of $\pm \frac{1}{8}''$ for a display area of about 10" by 7½", a feedback element of about ½" by 1" should be adequate for both convergence and geometry correction. The element spacing is, of course, dependent on element size and number, as well as the size of the display area itself.

The feedback signals may also comprise X-ray radiation produces as the electron beam impinges the iron-based material of the shadow mask. As the shadow mask material is of relatively high atomic number (high Z), coating the non-feedback-element areas of the mask with a material of low atomic number (low Z), such as copper, produced an array of feedback elements 50 capable of emitting X-ray radiation in response to a passing electron beam. If desired, the shadow mask may be coated with a first layer of even higher Z material, such as tungsten, to further enhance the X-ray emissions. A semiconductor detector, optimized for the X-ray spectrum of the particular material used, may be positioned within the tube to detect the feedback signals.

As a fourth alternative, the feedback elements 50 may be formed as apertures in a conuctive/insulative coating deposited over the gun-side surface of the shadow mask 48. A process for forming such elements is as follows:

1. Coat the surface of the shadow mask with a suitable insulative material.
2. Coat the insulative material with a suitable metallic or other conductive material to form, with the insulative material and shadow mask 48, a conductor/insulator/conductor sandwich.
3. Using known photoetching technology, remove both the insulative and conductive materials at those locations and in those shapes defining the desired feedback elements 50.

As so formed, the feedback elements 50 comprise specially configured apertures extending through the deposited layers of conductive and insulative material, but not through the shadow mask itself. (The original, much smaller apertures forming the shadow-mask perforations are, of course, carefully maintained.)

Via external electrical connection (a fourth embodiment of the interface 58) to both the shadow mask 48 and the conductive layer, it is possible to detect both positive and negative indications of a passing electron beam. When the beam is in the area defined by an element aperture, a beam current will be induced in the shadow mask; when the beam is elsewhere in the display area, a beam current will be induced in the conductive overlay. The first condition may be considered a positive indication, and the second, a negative indication. Some beam current will, of course, be induced into the shadow mask 48 as the beam passes through the smaller dot-defining perforations extending through the entire sandwich; however, this latter current should be readily distinguishable from the feedback currents. Processing of the feedback currents to produce the desired correction signals is accomplished via the procedure outlined earlier.

Figure 5:
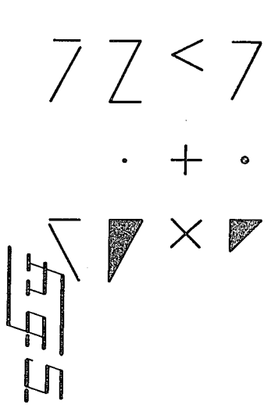
FIG. 5 is a representative sample of feedback element configurations suitable for use with the cathode-ray tube of the present invention.
Figure 11:
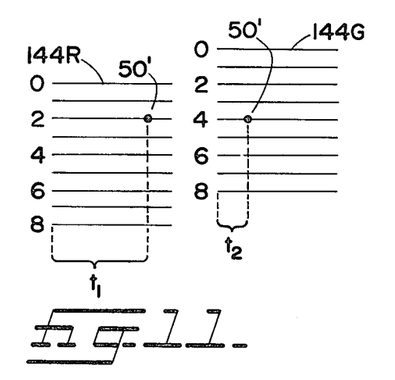
FIG. 11 is a representation of two raster line groupings developed during a particular operation of the system of FIG. 4.

As suggested earlier with reference to FIG. 5, the feedback element may assume a number of different forms. For reasons indicated, the element configuration of FIG. 6 is preferable when the convergence process is performed using single line segments. In some instances, however, it may be advantageous to employ a smaller, simpler element configuration, such as a single dot, and perform the convergence process using a raster of line segments such as might be used to interrogate a monoscope or flying spot scanner. Such a process is indicated in FIG. 11. In the left portion of that figure there is shown a raster of eight red line segments 144R superimposed over a feedback dot 50'. For convenience, the even line segments 0 through 8 have been numbered along the left side of the raster. As the raster is generated, suitable counters or other means are activated to record the line number and time $t_1$ at which a first feedback signal is detected. The process is then repeated, as indicated in the right portion of FIG. 12, with a raster of eight green line segments 144G to obtain a new line number and time $t_2$. The amount of correction necessary to move the rasters into convergence determined essentially as suggested earlier.

Figure 10:
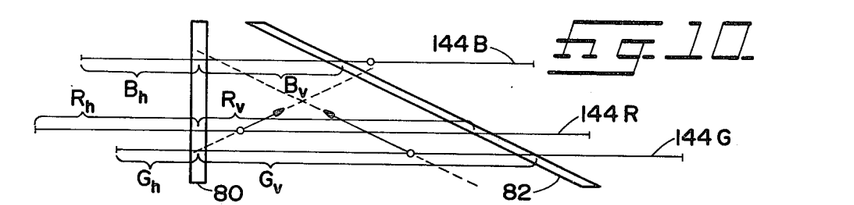
FIG. 10 is a second representation of the feedback element of FIG. 6 showing certain timing relationships developed during the operation of the tube and system of FIG. 4.
Figure 12:
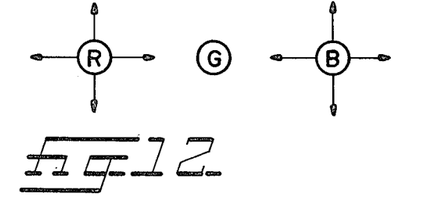
FIG. 12 is a symbolic representation of the beam adjustments available in a conventional in-line gun shadow-mask type cathode-ray tube.

The disclosure thus far has been made primarily with reference to a delta-gun type CRT. As indicated earlier, this is not meant to be limiting as the concept of the present invention is equally applicable to other gun arrangements as well as to CRT's having more or less than three electron guns. In FIG. 12 there is shown the three horizontally aligned beams of an in-line type CRT together with an indication of the four degrees of beam adjustment usually available to obtain convergence. As before, each beam is represented by a circle enclosing the letter R, G, or B to indicate the particular color, red, green, or blue, respectively produced by the beam. Note that the center beam is fixed, i.e., movable only via deflection, while the two outboard beams may each be moved in two dimensions. To converge the three beams, the outboard beams are merely moved as necessary relative to the center beam. Such process is well known to the art. The process to be followed by the system of the present invention to obtain and maintain such convergence should be equally apparent to those persons comprehending the earlier discussion relative to FIG. 10. Now, instead of converging the red and green beams and then moving the blue beam into coincidence, the two outboard beams are moved toward the center. The signal detection and timing evaluation process remains substantially the same.

Although the preceding discussion has been directed primarily to automatic beam convergence, the basic concept applies as well to the automatic correction of known types of geometric distortion. To perform such correction, it is only necessary to know the desired position of each converged scan line relative to the known physical location of its respective feedback element. That physical location may be determined by physical measurement during the manufacturing process or it may be obtained via the correction system itself. Once the display raster is converged and adjusted to geometric acceptance, it is a simple matter to store the detected position (in terms of $t_1$, $t_2$, and $t_3$) of a given scan line relative to its feedback element and then maintain that position via future automatic adjustment.

As will be recognized by those persons skilled in the art, the basic concept of a feedback element within a CRT is not limited to shadow-mask type color CRT's, but is applicable as well to other CRT's, monochromatic or color, having either single or multiple gun structures. Most of the principles regarding beam convergence in a shadow-mask CRT apply equally well to controlled beam misconvergence in a multi-beam monochromatic CRT having a single shared deflection system. For example, monochromatic display systems are known wherein two or more electron beams are deflected in parallel across a display medium to produce an image raster having an increased number of raster lines or a decreased frame rate. In such systems, it is precise beam misconvergence that is important, rather than precise convergence. Geometric correction, of course, is important in both color and monochromatic CRT's, whether a shadow mask is employed or not.

For those CRT's having no shadow mask, the feedback elements 50 are most conveniently spaced around the periphery of the image quality area, either by being formed on a surrounding support frame placed within the tube or by being formed on the display screen itself. As long as the feedback element is located outside the image quality area, the effect on the displayed image will be minimal and the element may be formed as described earlier. If the element is placed within the quality area, however, special care must be taken to minimize its visibility to the system operator and to isolate its visible output from that of the system display. Accordingly, the preferable element configuration is a small dot or point such as was described earlier with reference to FIG. 11. The dot element, because of its small size and point-like configuration, may be placed at selected locations over the display screen without affecting adversely the image being displayed. Interrogation of the dot element on a display screen is essentially as described earlier, also with reference to FIG. 11, using a beam density just sufficient to produce a reliable feedback signal. Such a low level beam density will also excite the display phosphor, but at a level sufficiently low as to be relatively unnoticeable.

The terms and expressions which have been used in the foregoing specification are used therein as terms of description and not of limitation, and there is no intention, in the use of such expressions, of excluding equivalents of the features shown and described or portions thereof, it being recognized that the scope of the invention is defined and limited only by the claims which follow.

We claim as our invention:

1. A cathode-ray tube comprising a display screen of phosphorescent material, an electron gun for producing an electron beam directed toward said display screen, a shadow mask interposed between said electron gun and said display screen, and a feedback element disposed at a preselected location on a surface of said shadow mask, said element being formed of a material capable of providing a detectable response upon bombardment by said beam and configured to provide, upon scanning by the beam, information denoting the location of the beam in two dimensions.

2. The cathode-ray tube of claim 1 wherein said feedback element is formed of a phosphorescent material.

3. The cathode-ray tube of claim 1 wherein said feedback element is formed of an emitter of secondary electrons.

4. The cathode-ray tube of claim 1 wherein said feedback element is formed of a conductive material electrically isolated from said surface of said shadow mask.

5. The cathode-ray tube of claim 1 wherein said feedback element is formed of a high-Z material surrounded by a low-Z material.

6. The cathode-ray tube of claim 1 further comprising a coating of insulative material overlaying said surface of said shadow mask, said material defining an aperture at said location on said surface, and wherein said feedback element comprises the area of said shadow mask included within said aperture.

7. The cathode-ray tube of claim 1 further comprising a plurality of said feedback elements disposed at preselected locations spaced about said surface of said shadow mask.

8. The cathode-ray tube of claim 1 wherein said feedback element defines in configuration two legs of a right triangle.

9. The cathode-ray tube of claim 8 wherein said legs of said triangle are disjointed.

10. The cathode-ray tube of claim 8 wherein a first leg of said triangle is oriented vertically and the second leg is oriented at an acute angle to the first.

11. The cathode-ray tube of claim 8 wherein the horizontal widths of said two legs of said element are the same.

12. The cathode-ray tube of claim 9 wherein the value of said acute angle is 60 degrees.

13. In a cathode-ray tube of the kind including a display screen, an electron gun, and a shadow mask interposed therebetween, the improvement comprising: feedback means associated with said shadow mask for producing an indication representative of the location of said beam in two dimensions.

14. A cathode-ray tube shadow mask unit for use in a beam position feedback-type CRT, said mask unit comprising a perforated metal sheet and feedback means associated therewith for providing, upon scanning of the sheet by an electron beam, information denoting the beam's intercept location in two dimensions.

15. The mask unit of claim 14, wherein said feedback means comprises a material capable of providing a photodetectable response upon bombardment by an electron beam.

16. The mask unit of claim 15, wherein said feedback means comprises a material capable of emitting radiation within at least a portion of the visible and ultraviolet light spectrum.

17. The mask unit of claim 16, wherein said feedback means comprises a phosphorescent material.

18. The mask unit of claim 14 wherein said feedback means comprises means for producing an electrically detectable response upon bombardment by an electron beam.

19. The mask unit of claim 18, wherein said feedback means comprises a material that emits secondary electrons upon such bombardment.

20. The mask unit of claim 18, wherein said feedback means comprises a material that emits x-rays upon such bombardment.

21. The mask unit of claim 18, wherein said feedback means comprises an element formed of a conductive material electrically isolated from said sheet.

22. The mask unit of claim 18, wherein said feedback means comprises an element formed of a high-Z material surrounded by a low-Z material.

23. The mask unit of claim 18, wherein said unit further comprises a coating of insulative material overlaying a surface of said sheet, said coating including an aperture exposing a defined area of the sheet, and wherein said feedback means comprises said defined area.

24. The mask unit of claim 14, wherein said feedback means comprises a discrete feedback element disposed at a preselected location on a surface of said sheet.

25. The mask unit of claim 24, wherein said feedback means comprises a plurality of such elements distributed over the surface of said sheet.

26. The mask unit of claim 24, wherein said feedback means comprises a pair of associated linear elements disposed in an angular arrangement.

27. The mask unit of claim 26, wherein said elements are of the same width as measured along the direction of electron beam scanning.

28. The mask unit of claim 26, wherein one of said elements is oriented at right angles to the direction of electron beam scanning, and the other is oriented at an acute angle relative thereto.

29. The mask unit of claim 28, wherein said acute angle is approximately 60 degrees.

* * * * *